US010012216B2

(12) United States Patent
Liu et al.

(10) Patent No.: US 10,012,216 B2
(45) Date of Patent: Jul. 3, 2018

(54) HEATER OF HEAT STORAGE AGENT AND BRAYTON SOLAR THERMAL POWER UNIT WITH HEAT STORAGE

(71) Applicant: Hongzhang Liu, Beijing (CN)

(72) Inventors: Hongzhang Liu, Beijing (CN); Jia Fu, Beijing (CN); Wei Li, Beijing (CN)

(73) Assignee: Hongzhang Liu, Beijing (CN)

( * ) Notice: Subject to any disclaimer, the term of this patent is extended or adjusted under 35 U.S.C. 154(b) by 189 days.

(21) Appl. No.: 15/025,801

(22) PCT Filed: Sep. 29, 2014

(86) PCT No.: PCT/CN2014/087755
§ 371 (c)(1),
(2) Date: Jun. 21, 2016

(87) PCT Pub. No.: WO2015/043534
PCT Pub. Date: Apr. 2, 2015

(65) Prior Publication Data
US 2016/0298610 A1 Oct. 13, 2016

(30) Foreign Application Priority Data
Sep. 29, 2013 (CN) .......................... 2013 1 0453326

(51) Int. Cl.
F03G 6/00 (2006.01)
F28D 20/00 (2006.01)
(Continued)

(52) U.S. Cl.
CPC ................. F03G 6/00 (2013.01); F03G 6/06 (2013.01); F03G 6/067 (2013.01); F24J 2/07 (2013.01);
(Continued)

(58) Field of Classification Search
CPC .... F03G 6/00; F03G 6/06; F03G 6/067; F24J 2/30; F24J 2/02; F24J 2/46; F24J 2/34; F24J 2/07; F28D 20/00; Y02E 60/142; Y02E 70/30; Y02E 10/41; Y02E 10/46

USPC .......... 60/641.8–641.15, 650, 659, 682–684
See application file for complete search history.

(56) References Cited

U.S. PATENT DOCUMENTS 5,448,889 A * 9/1995 Bronicki ................... F02C 1/05
60/641.14
2004/0244376 A1* 12/2004 Litwin .................... F03G 6/064
60/641.8

(Continued)

FOREIGN PATENT DOCUMENTS

| CN | 101122422 B | 2/2008 |
| CN | 102913405 A | 2/2013 |

(Continued)

OTHER PUBLICATIONS

International Search Report for International Application No. PCT/CN2014/087755, dated Jan. 16, 2015, 8 pages.

Primary Examiner — Hoang Nguyen
(74) Attorney, Agent, or Firm — Knobbe Martens Olson & Bear LLP

(57) ABSTRACT

The present disclosure describes a heater of heat storage agent and a Brayton solar thermal power unit with heat storage. The Brayton solar thermal power unit with heat storage may include: a heat storage agent flow adjusting module, a solar energy collecting module, a heater of heat storage agent, a heat exchange module, a thermal power generating module a heat storage agent transporting module. The heat storage agent flow adjusting module may be connected with the heat storage agent transporting module and the heater. The heater may be connected with the solar power collecting module, and the heat exchange module. The heat exchange module may be connected with the thermal power generating module and the heat storage agent transporting module. The present disclosure can significantly increase maximum power capacity of Brayton solar thermal power unit to megawatt level, improve operation efficiency, and avoid discontinuity and instability of solar power generation.

17 Claims, 4 Drawing Sheets

(51) Int. Cl.
*F24J 2/07* (2006.01)
*F24J 2/34* (2006.01)
*F03G 6/06* (2006.01)
*F24J 2/46* (2006.01)

(52) U.S. Cl.
CPC ............... F24J 2/34 (2013.01); F28D 20/00 (2013.01); F28D 20/0056 (2013.01); *F24J 2/4649* (2013.01); *F28D 2020/0078* (2013.01); *Y02E 10/41* (2013.01); *Y02E 10/46* (2013.01); *Y02E 60/142* (2013.01); *Y02E 70/30* (2013.01)

(56) References Cited

U.S. PATENT DOCUMENTS

| | | | | |
|---|---|---|---|---|
| 2009/0308072 | A1* | 12/2009 | Kay | F02C 1/05 60/641.8 |
| 2010/0024421 | A1* | 2/2010 | Litwin | F02C 1/05 60/641.8 |
| 2011/0252797 | A1 | 10/2011 | Kobayashi et al. | |
| 2012/0216536 | A1* | 8/2012 | Ma | F03G 6/00 60/641.8 |
| 2013/0133324 | A1 | 5/2013 | Reynolds | |
| 2013/0257056 | A1* | 10/2013 | Ma | F03G 6/065 290/52 |

FOREIGN PATENT DOCUMENTS

| | | | |
|---|---|---|---|
| CN | 103542552 | A | 1/2014 |
| CN | 203615621 | U | 5/2014 |
| DE | 102010063116 | A1 | 6/2012 |
| WO | WO 2009/016423 | A2 | 2/2009 |

\* cited by examiner

HEATER OF HEAT STORAGE AGENT AND BRAYTON SOLAR THERMAL POWER UNIT WITH HEAT STORAGE

TECHNICAL FIELD

The present disclosure relates to solar thermal power techniques, and particularly, to a heater of heat storage agent and a Brayton solar thermal power unit with heat storage.

BACKGROUND

Tower solar thermal power technique is among the best solar thermal power techniques for constructing large-scale, industrialized power plants taking account of both technical and economic factors. Among tower thermal power techniques, those using Brayton cycle outperform those using Rankine cycle in aspects such as high efficiency, shorter working process, less water consumption, and easy to implement solar energy and fossil (oil or gas) hybrid power generation. The tower Brayton thermal power techniques are more promising than those industrialized tower Rankine techniques. German National Space Agency Solar R & D Center (DLR) and Isreal Weizmann Institute of Science (WIS) are outstanding representative developers of tower Brayton solar thermal power techniques.

A Brayton cycle-based tower power generator uses a turbine to drive the generator, and uses compressed-air which is heated by solar energy to a temperature of about 900° C. as the working fluid (working fluid with a temperature lower than 900° C. may remarkably decrease the efficiency of the turbine). A volumetric receiver developed by DLR and WIS uses a quartz glass cover which can allow the sunshine to pass while maintaining the air pressure within the cover. A sealed interface between the quartz glass cover and the body of the volumetric receiver may also require water cooling to ensure the reliability of the sealing under high temperature. In order to prevent recrystallization of the quartz glass to become opaque at a temperature above 1000° C., it is necessary to use high purity quartz glass. Compression-resistant high purity quartz glass covers are hard to manufacture, expensive, and hard to be produced in large size, which restricts the maximum power capacity of a single tower Brayton thermal solar power unit to be within 200 KW (a completed experimental unit has a capacity of only 100 KW). There have been cases in longer-term operation where such volumetric receivers have the quartz glass or the sealing damaged, and this has become the bottleneck in technological development. In addition, in conventional tower solar thermal power techniques, molten salt is generally used as the heat storage agent, and the most commonly used salt is a mixture of potassium nitrate and sodium nitrate. Since high-temperature air is required, the molten salt cannot be used in a tower Brayton solar thermal power plant because the upper limit of working temperature of molten salt is 600° C., much lower than 900° C. which is the temperature required by the turbine for optimal operation efficiency. Thus, the use of molten salt will make the operation efficiency of a tower Brayton thermal power unit with heat storage so low that the apparatus cannot be put to use.

SUMMARY

Various embodiments of the present disclosure provide a heater of heat storage agent to increase the maximum power capacity of a single Brayton solar thermal power unit with heat storage and improve operation efficiency.

Various embodiments of the present disclosure also provide a Brayton solar thermal power unit with heat storage to increase the maximum power capacity of a single Brayton solar thermal power unit with heat storage and improve operation efficiency.

The heater of heat storage agent according to various examples may include: a feeder, a threaded screw sleeve and a heat storage agent collector.

The feeder is provided at an upper part of the heater, capable of receiving heat storage agent discharged from above the heater and discharging the heat storage agent into the threaded screw sleeve.

The threaded screw sleeve is provided at the middle of the heater, including a multi-threaded screw sleeve made of high temperature materials; the multi-threaded screw sleeve comprises a hollow interior, a plurality of spiral slideways are provided in an inner wall of the multi-threaded screw sleeve for receiving the heat storage agent discharged from the feeder and directing the heat storage agent to flow along the spiral slideways; a falling speed of the heat storage agent in the spiral slideways is adjustable by adjusting a rotation speed of the multi-threaded screw sleeve; the hollow interior is capable of housing concentrated solar radiation outputted by an exterior solar power collecting module and heating the heat storage agent discharged into the multi-threaded screw sleeve using the concentrated solar radiation.

The heat storage agent collector is provided at a lower part of the heater, capable of receiving the heat storage agent heated and discharged from the multi-threaded screw sleeve and outputting the heated heat storage agent.

The Brayton solar thermal power unit with heat storage of various embodiments may include: a heat storage agent flow adjusting module, a solar energy collecting module, the heater of heat storage agent, a heat exchange module, a thermal power generating module and a heat storage agent transporting module.

The heat storage agent flow adjusting module is configured to apply flow control to heat storage agent flowing into the heater according to an intensity of solar radiation outputted by the solar power collecting module;

The solar energy collecting module is configured to collect solar energy using one or multiple concentrators, and heat the heat storage agent in the heater using the collected solar energy.

The heat exchange module is configured to perform heat exchange between heat storage agent discharged from the heater and compressed air from the thermal power generating module, output the compressed air after the heat exchange to the thermal power generating module, output the heat storage agent after the heat exchange into the heat storage agent transporting module.

The heat storage agent transporting module is configured to collect the heat storage agent discharged by the heat transferring module, transport and output the collected heat storage agent to the heat storage agent flow adjusting module; and The thermal power generating module is configured to convert thermal energy of the compressed air from the heat exchange module into mechanical energy, convert the mechanical energy into electrical energy; compress atmospheric air to generate the compressed air, perform first heat exchange between the compressed air and exhaust gas with residual heat from the thermal power generating module, and output the compressed air after the first heat exchange to the heat exchange module.

An air heater of various embodiments may include: a particle entrance component, a row of air heating pipes, connecting pipes joining the air heating pipes, and air entrance and exit pipes, the particle entrance component is provided at the top of the air heater with a high-temperature particle moving bed, comprises an entrance for heat storage agent, and is configured to direct the heat storage agent discharged via a discharge control valve into a hollow interior formed by a shell component;

the air entrance and exit pipes, the row of air heating pipes and the connecting pipes are provided in the hollow interior of the air heater;

the row of air heating pipes comprises a plurality of heating pipes, an upper linking pipe, and a lower linking pipe, the heating pipes are filled with a porous material for dividing compressed air with a first temperature from the thermal power generating module into fine flows and direct the compressed air to flow against the heat storage agent outside the heating pipes to heat the compressed air to a second temperature higher than the first temperature;

the connecting pipes are configured to join the air heating pipes, and are joined with the air entrance and exit pipes, wherein the compressed air with the first temperature enters and the compressed air with the second temperature exits the connecting pipes through the air entrance and exit pipes; and the air entrance and exit pipes are configured to allow compressed air to flow between the thermal power generating module and the connecting pipes.

A method of controlling a temperature of heated heat storage agent in a Brayton solar thermal power unit with heat storage according to various embodiments may include:

providing a Brayton solar thermal power unit with heat storage which includes a heater of heat storage agent and a heat storage agent flow adjusting module; the heat storage agent flow adjusting module is capable of obtaining heat storage agent and discharging the obtained heat storage agent into the heater through a flow control valve provided at the bottom of the heat storage agent adjusting module; the heater includes a multi-threaded screw sleeve made of high temperature materials, the multi-threaded screw sleeve has a hollow interior, a plurality of spiral slideways are provided in an inner wall of the multi-threaded screw sleeve for receiving the heat storage agent from the heat storage agent flow adjusting module, the heat storage agent discharged in the multi-threaded screw sleeve is heated by solar radiation concentrated in the hollow interior;

sensing a temperature of the heat storage agent outputted by the heater;

comparing the sensed temperature with a pre-determined temperature threshold; in response to a determination that the sensed temperature is inconsistent with the temperature threshold, adjusting a rotation speed of the multi-threaded screw sleeve to change a falling speed of the heat storage agent in the heater, and adjusting an opening of the flow control valve of the heat storage agent flow adjusting module to change the flow of the heat storage agent in the heater, until it is determined the sensed temperature of the heat storage agent is consistent with the pre-determined temperature threshold.

According to the above technical solution, the heater of heat storage agent and the Brayton solar thermal power unit with heat storage can control the temperature of heat storage agent by using a heater whose body, i.e., the threaded screw sleeve having the hollow interior, made of high-temperature materials (e.g., silicon carbide or silicon nitride ceramics having high temperature strength under 1400° C. to 1600° C.), heating the heat storage agent using solar radiation concentrated in the hollow interior of the threaded screw sleeve which includes a rotatable multi-threaded screw sleeve, and controlling the residence time, i.e., the falling speed, of the heat storage agent in the hollow interior of the threaded screw sleeve by controlling the rotation speed of the threaded screw sleeve so as to control the time during which the heat storage agent is heated by the solar radiation, thereby controlling the temperature of the heat storage agent. When the heat storage agent has a high sintering temperature (such as ceramic microspheres), the heater can heat the heat storage agent to a temperature higher than 900° C. which is the temperature required by a turbine for the optimal operation efficiency. Therefore, compressed air heated using the heat storage agent can reach a temperature of about 900° C. which is the temperature required by a turbine for the optimal operation efficiency.

The Brayton solar thermal power unit with heat storage can adjust the rotation speed of the threaded screw sleeve of the heater of heat storage agent and the flow of heat storage agent in the heater according to the solar radiation intensity by using the above heater and the heat storage agent flow adjusting module which is capable of adjusting the flow of heat storage agent in the heater, thus can keep the temperature of the heat storage agent within a required temperature range.

The air heater of various embodiments can heat compressed air rapidly to a required temperature by using a row of air heating pipes filled with porous materials which divides moderate-temperature compressed air from the thermal power generating module into fine flows and directs the compressed air to flow against the high-temperature heat storage agent outside the heating pipes to exchange heat.

When silicon carbide or silicon nitride ceramic that can withstand high temperatures of 1400° C.-1600° C. is used to produce the heater for heating the heat storage agent, because the heater is simple to manufacture, inexpensive, and easy to be produced in large scale, the maximum power capacity of the single tower Brayton thermal power unit with heat storage can be effectively increased. When ceramic microspheres with a sintering temperature of up to 1600° C. are used as the heat storage agent for heating the working fluid, the working fluid can be heated to a temperature of about 900° C. which is required by a turbine for the optimal operation efficiency. Thus, the operation efficiency of the tower Brayton thermal power unit with heat storage can be improved.

BRIEF DESCRIPTION OF THE DRAWINGS

In order to make the technical solutions of embodiments of the present disclosure or conventional mechanism more clearly, the following is a brief introduction of the drawings used in description of the embodiments or the conventional art. Obviously, the following drawings are merely some of the embodiments, and based on which other embodiments and drawings can be obtained by those skilled in the art.

DETAILED DESCRIPTIONS

Figure 1:
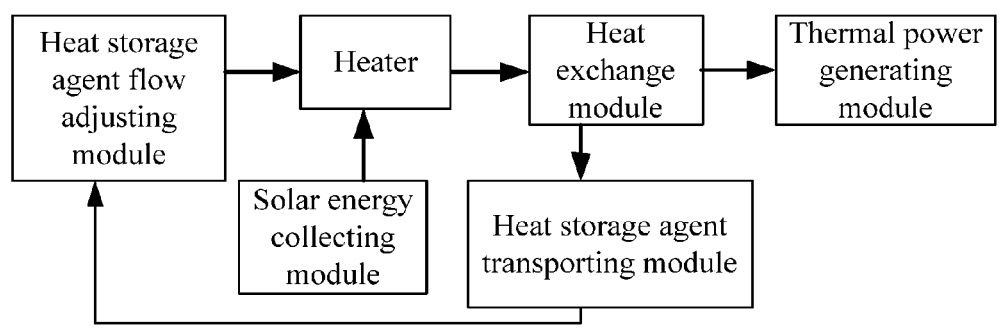
FIG. 1 is a schematic diagram illustrating modules of a tower Brayton solar thermal power unit with heat storage in accordance with embodiments of the present disclosure.

The technical solutions of embodiments of the present disclosure are described hereinafter clearly and completely with reference to the accompanying drawings. It should be understood that the embodiments described are merely some embodiments of the present disclosure, not all of the embodiments. Based on the embodiments of the present disclosure, other embodiments obtained by those skilled in the art without any inventive work are still within the protection scope of the present disclosure.

Conventional Brayton solar thermal power generation devices heat the air by reflecting concentrated solar radiation into the heater, which necessitate the use of quartz glass covers. When above 1000° C., a quartz glass cover is prone to recrystallization to become opaque even if it contains very small amount of impurities. Therefore, the heater is required to use high purity quartz glass to avoid recrystallization. But compression-resistant high purity quartz glass covers are hard to manufacture, very expensive, and hard to be manufactured in large scale, which restricts the maximum power capacity of a single tower Brayton cycle solar thermal power generation device to be within 200 KW. Further, most of conventional tower thermal power generation devices use molten salt as heat storage agent. Since the upper limit of working temperature of molten salt is 600° C., it is impossible to use molten salt for heating air because the molten salt does not meet the temperature requirement of Brayton cycle.

Silicon carbide or silicon nitride ceramics have excellent properties under both room temperature and high temperature, such as high flexural strength, excellent oxidation resistance, good corrosion resistance, high abrasion resistance and low coefficient of friction. Moreover, high temperature strength of silicon carbide or silicon nitride ceramics can be maintained under 1400° C.~1600° C., thus silicon carbide or silicon nitride ceramics are among ceramic materials having the best high temperature strengths. Further, silicon carbide ceramic foam may have a surface-to-volume ratio of up to 500 to 700 or more and a heat transfer coefficient twice as much as that of metal under high temperatures, thus has good thermal conductivity. In practical applications, silicon carbide ceramics have a less complex manufacturing process, less expensive, and are easy to be produced in large quantities.

Further, in oil exploration, ceramic microspheres are widely used as proppant where oil bearing formation is pressed to fracture. Such ceramic microspheres have alumina as its main component, and have properties such as high density (a stacking density of 1.8 to 2.0), high strength, good chemical stability, high thermal shock resistance, large heat capacity (greater than 1 to 1.2), etc. The ceramic microspheres have an average diameter of less than 1 mm, and the size is appropriate. The ceramic microspheres also have a compact structure, good thermal conductivity, mechanical strength and heat resistance. The sintering temperature of the ceramic microspheres can be as high as 1600° C. Furthermore, the alumina ceramic microspheres have high hardness, smooth surface, low coefficient of friction, and excellent wear resistance. Production of the ceramic microspheres has already been industrialized, can generate a large supply with low cost.

According to various examples of the present disclosure, in view of the above properties of the silicon carbide or silicon nitride ceramics and the ceramic microspheres, the silicon carbide or silicon nitride ceramics and the ceramic microspheres may be used in solar thermal power generation.

The silicon carbide or silicon nitride ceramics may be used in manufacturing heater of heat storage agent. Due to the high temperature strength of silicon carbide or silicon nitride ceramics can be maintained under 1400° C.~1600° C., silicon carbide or silicon nitride ceramics can withstand the temperature of up to 1000-1100° C. formed by concentrated solar radiation in the cavity of a silicon carbide threaded screw sleeve for heating the heat storage agent. The manufacturing process is simple, inexpensive, easy for large scale production, thereby the maximum power capacity of a single Brayton thermal power unit with heat storage can be effectively increased.

Alumina ceramic microspheres have good temperature resistance, and have a sintering temperature of as high as 1600° C. According to various examples, the alumina ceramic microspheres may be used as the heat storage agent. Working fluid heated by alumina ceramic microspheres with temperatures of up to 1000° C. may reach a temperature of about 900° C. which enables a turbine to work with the optimal operation efficiency, thus the operation efficiency of a Brayton thermal power unit with heat storage can be improved.

The following takes a tower Brayton solar thermal power unit with heat storage as an example. In other examples, the invention can also be applied to disc Brayton solar thermal power unit with heat storage.

FIG. 1 is a schematic diagram illustrating modules of a tower Brayton solar thermal power unit with heat storage in accordance with embodiments of the present disclosure. As shown in FIG. 1, the tower Brayton solar thermal power unit with heat storage may include: a heat storage agent flow adjusting module, a solar energy collecting module, a heater of heat storage agent, a heat exchange module, a thermal power generating module and a heat storage agent transporting module. The heat storage agent flow adjusting module may be connected with the heat storage agent transporting module and the heater of heat storage agent respectively. The heater may be connected with the solar energy collecting module and the heat exchange module respectively. The heat exchange module may be connected with the thermal power generating module and the heat storage agent transporting module respectively.

Figure 2:
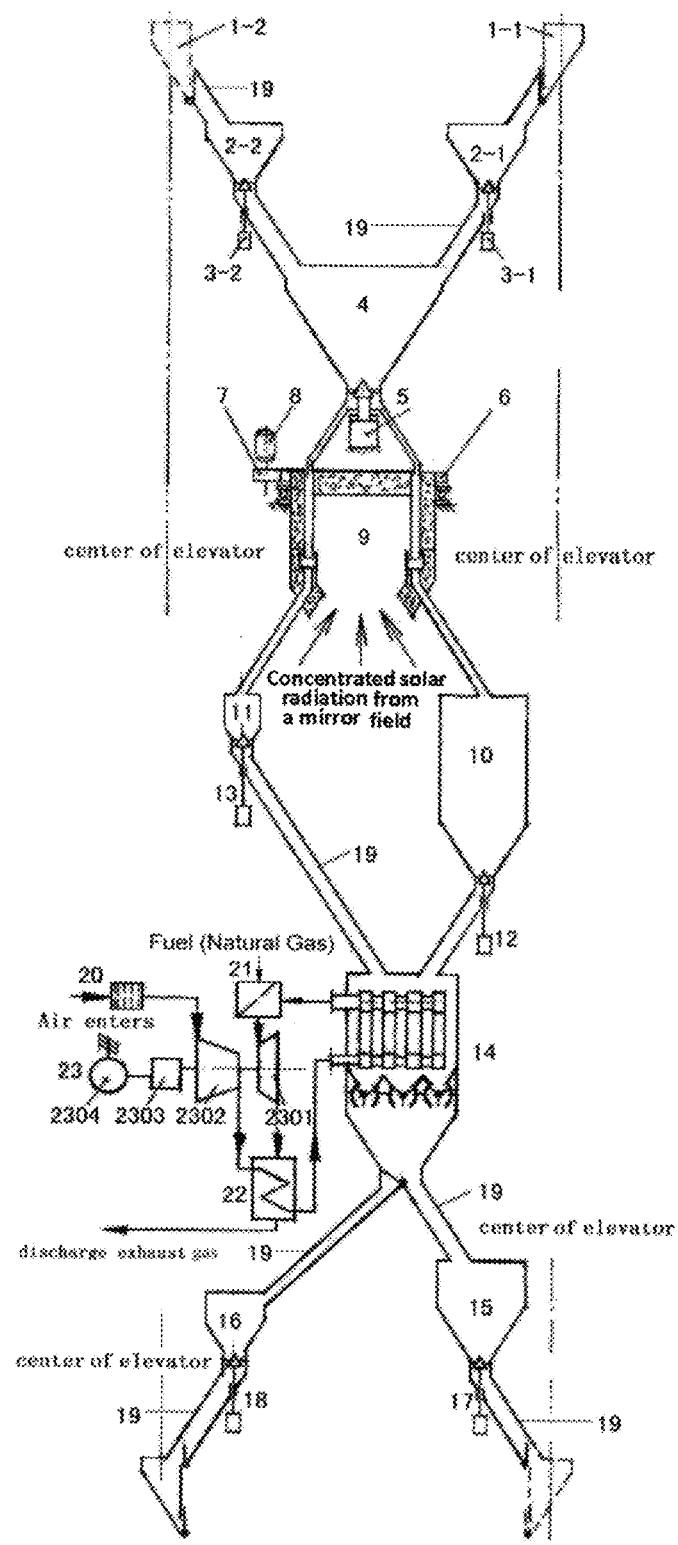
FIG. 2 is a schematic diagram illustrating the structure of a tower Brayton solar thermal power unit with heat storage in accordance with embodiments of the present disclosure.

FIG. 2 is a schematic diagram illustrating the structure of a tower Brayton solar thermal power unit with heat storage in accordance with embodiments of the present disclosure. As shown in FIG. 2, the modules may be as follows.

1. The heat storage agent flow adjusting module may include:

hopper, including: a first hopper 1-1 of a first elevator for lifting heat storage agent and a second hopper 1-2 of a second elevator for lifting heat storage agent;

discharge tank, including: a first discharge tank 2-1 and a second discharge tank 2-2;

discharge valve, including: a first discharge valve 3-1 provided at the bottom of the first discharge tank 2-1, and a second discharge valve 3-2 provided at the bottom of the second discharge tank 2-2;

storage tank 4 and flow control valve 5 for controlling flow of heat storage agent; and connecting pipes 19 respectively connecting the hopper with the discharge tank and connecting the discharge tank with the storage tank.

The hopper may transport heat storage agent collected by the heat storage transporting module to a discharge tank via an elevator. The hopper may have automatic loading and unloading capabilities.

The discharge tank may store heat storage agent discharged from the hopper.

Each discharge valve is provided at the bottom of a discharge tank, may adjust the flow rate of the heat storage agent discharged from a discharge tank to the storage tank.

The storage tank may store the heat storage agent discharged from a discharge tank via a discharge valve.

The flow control valve may be provided at the bottom of the storage tank, and adjust the flow rate of the heat storage agent flowing into the heater according to the intensity of the solar radiation outputted by the solar energy collecting module.

In various examples, two hoppers and two discharge tanks may be provided, and may be disposed symmetrically on both sides of the solar tower of the tower Brayton solar thermal power unit with heat storage.

In an example, cross section of the first hopper 1-1, the second hopper 1-2, the first discharge tank 2-1, the second discharge tank 2-2 and the storage tank 4 may be in the shape of a square.

As such, heat storage agent with a temperature of about 600° C. may be elevated from the base of the tower Brayton solar thermal power unit with heat storage to the top of the apparatus via hoppers 1-1 and 1-2, and then discharged into the discharge tanks 2-1 and 2-2 via respective connecting pipes 19. The heat storage agent in the discharge tanks 2-1 and 2-2 may flow into the storage tank 4 via discharge valves 3-1 and 3-2 at the bottom (lower part) of the discharge tanks, and enter the heater 9 via the flow control valve 5 at the lower part of the storage tank 4.

2. The heater 9 may include: a feeder, a threaded screw sleeve and a heat storage agent collector.

In an example, the feeder may have an umbrella-shape discharge channel, i.e., the cross section of the discharge channel may be in a ring shape. The feeder may be provided at an upper part of the heater, may receive heat storage agent discharged via the flow control valve 5 and discharge the heat storage agent into the threaded screw sleeve.

The threaded screw sleeve may be provided at the middle part of the heater 9, and may include a rotatable multi-threaded screw sleeve with a hollow interior. The rotatable multi-threaded screw sleeve may be made of high temperature materials, such as silicon carbide or silicon nitride ceramics. A plurality of spiral slideways may be provided in the inner wall of the rotatable multi-threaded screw sleeve, i.e., the multi-threaded screw sleeve may be a multi-interior-threaded screw sleeve. In an example, the cross section of the slideways in the threaded screw sleeve may be rectangular, and the threaded screw sleeve may be referred to as a multi-interior-threaded screw sleeve with rectangular slideways. The threaded screw sleeve may receive heat storage agent discharged from the umbrella-shape feeder. The solar energy collecting module may collect solar radiation and concentrate the collected solar radiation into the hollow interior to form a high-temperature fire ball with a temperature of up to 1000~1100° C. for heating the heat storage agent flowing down. In various examples, according to the intensity of solar radiation collected by the solar energy collecting module, the rotation speed of the rotatable multi-threaded screw sleeve may be adjusted to change the falling speed of the heat storage agent, so that the temperature of the heat storage agent leaving the threaded screw sleeve can be stabilized at a pre-determined value and do not change significantly with changes in the solar radiation intensity. The heat storage agent discharged into the rotatable multi-threaded screw sleeve may be heated using the solar radiation outputted by the solar energy collecting module, and the heated heat storage agent may be discharged into the heat storage agent collector.

In various examples, the shape of the cross section of the slideways of the rotatable multi-threaded screw sleeve may not be limited to rectangular. For example, the cross section of the slideways may be in the trapezoidal shape. The rotatable multi-threaded screw sleeve with rectangular slideways may be made of high temperature materials including, but not limited to ceramics.

The heat storage agent collector may be provided at a lower part of the heater, may output heat storage agent discharged from the threaded screw sleeve to the heat exchange module. According to various examples, the thermal storage agent collector may include a ring-shape receiving plate having a diameter corresponding to that of the rotatable multi-threaded screw sleeve. The thermal storage agent collector may also include a guide channel connected with the bottom of the ring-shape receiving plate for guiding the heat storage agent discharged from the threaded screw sleeve to the heat exchange module. In some examples, there may be two guide channels. In other examples, there may be only one guide channel, or multiple guide channels. The number of guide channels may be determined according to the needs.

In various examples, the heater 9 may have a cavity. The opening of the cavity may be in a cone shape and faces downwards. Solar radiation may be concentrated by the solar energy collecting module into the cavity of the heater and forms a high temperature fire ball with a temperature as high as 1000~1100° C. which can heat the heat storage agent rapidly to 1000° C. in about 2 seconds. The angle between the ground and the axis of the cavity having the downward opening may be within −30 to 30 degrees according to the latitude of the location of the solar thermal power plant.

Figure 3:
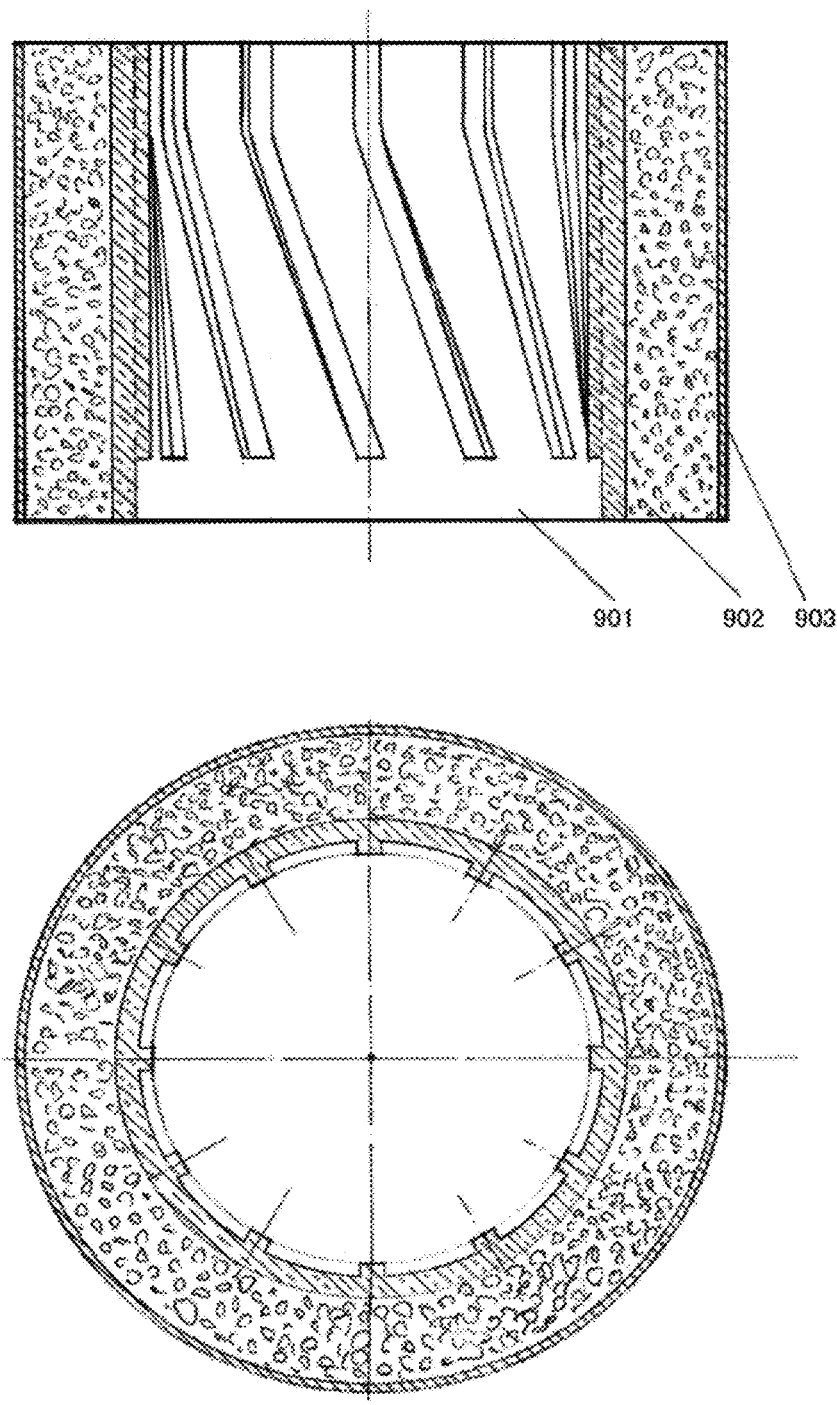
FIG. 3 is a schematic diagram illustrating the structure of a threaded screw sleeve of a heater of heat storage agent in accordance with embodiments of the present disclosure.

FIG. 3 is a schematic diagram illustrating the structure of a threaded screw sleeve of a heater of heat storage agent in accordance with embodiments of the present disclosure. The upper figure is a schematic diagram illustrating a cross-sectional view of the threaded screw sleeve, and the lower figure is a schematic diagram illustrating a top view of the threaded screw sleeve.

Referring to FIG. 3, the threaded screw sleeve may include: a rotatable multi-threaded screw sleeve 901 with rectangular slideways, a molded ceramic fiber insulation sleeve 902 and a carbon steel shell 903 of the rotatable part of the heater.

The carbon steel shell 903 may be provided at exterior of the threaded screw sleeve.

The rotatable multi-threaded screw sleeve 901 may be provided at interior of the threaded screw sleeve, include a plurality of rectangular spiral slideways for receiving the heat storage agent from the umbrella-shape feeder. The spiral slideways may be open in the direction towards the cavity in order to fully use the solar radiation to heat the heat storage agent.

The molded ceramic fiber insulation sleeve 902 may be provided between the carbon steel shell 903 and the rotatable multi-threaded screw sleeve 901 for preserving the heat of the heat storage agent.

According to various examples, the shape of the cross section of the spiral slideways may not be limited to rectangle, and the insulation sleeve for preserving the heat of the heat storage agent heat may be made of insulation materials including, but not limited to, ceramic fiber, rock wool, aluminum silicate, or the like. The spiral slideways may be uniformly distributed along the radial direction of the rotatable multi-threaded screw sleeve 901. The spiral slideways may be provided in the inner wall of the rotatable multi-threaded screw sleeve 901. In various examples, the spiral slideways may include two sections in the axial direction of the rotatable multi-threaded screw sleeve 901. An upper section may be in parallel to the axial direction, and the lower section may form an angle with the axial direction, i.e., the helix angle.

According to various examples, the helix angle of the spiral slideways in the rotatable multi-threaded screw sleeve 901 and the rotation speed of the rotatable multi-threaded screw sleeve 901 are key factors affecting the falling speed and the flow of the heat storage agent (e.g., ceramic microspheres). In various examples, it may be configured that the rotatable multi-threaded screw sleeve may rotate in a direction the same with or opposite to the helix direction of the spiral slideways. The helix angle of the spiral slideways may be determined according to a required flow rate of heat storage agent (e.g., ceramic microspheres), e.g., an angle between 5 degrees to 85 degrees. The rotation speed of the rotatable multi-threaded screw sleeve 901 may be related with the flow rate of the heat storage agent (such as ceramic microspheres), and may be inversely proportional to the diameter of the receiver of the heat storage agent. The number of the spiral slideways may be related with the diameter of the heater, i.e., the greater the diameter of the heater is, the more spiral slideways are required.

The width of the spiral slideways may be determined according to the diameter of the heat storage agent (e.g., ceramic microspheres) and the required flow rate of the heat storage agent. According to examples, the width of the spiral slideways may be about 3 to 20 times of the diameter of the heat storage agent (e.g., ceramic microspheres).

According to examples, a big gear 6 for delivering rotation to the heater, a small rotation transmission gear 7 for delivering rotation to the heater, and a variable-speed motor 8 for driving the heater to rotate (referring to FIG. 2) may be provided.

The big gear 6 may drive the rotatable multi-threaded screw sleeve 901 to rotate, and may be driven by the small gear 7. The small gear 7 may be driven by the variable-speed motor 8.

As such, when the solar radiation has low intensity, the variable-speed motor 8 may increase the rotation speed of the multi-threaded screw sleeve 901 to increase the centrifugal force generated by the rotation of the multi-threaded screw sleeve 901, thus the friction between the heat storage agent and the spiral slideways may be increased and the speed of the heat storage agent falling along the spiral slideways may be decreased. As such, the flow rate of the heat storage agent (e.g., ceramic microspheres) may be reduced, i.e., the sliding time of the heat storage agent sliding in the multi-threaded screw sleeve 901 may be prolonged, and the heat storage agent may be heated to the required temperature. When the solar radiation has high intensity, the variable-speed motor 8 may decrease the rotation speed of the multi-threaded screw sleeve 901 to decrease the centrifugal force generated by the rotation of the multi-threaded screw sleeve 901, and the friction between the heat storage agent and the spiral slideways may be decreased, thus the speed of the heat storage agent falling along the spiral slideways may be increased. As such, the flow rate of the heat storage agent (e.g., ceramic microspheres) may be increased, i.e., the sliding time of the heat storage agent sliding in the multi-threaded screw sleeve 901 may be shortened, and the temperature of the heated heat storage agent may be stabilized within the required temperature range.

In various examples, a split range control method may be used for controlling the flow rate of the heat storage agent and the sliding time of heat storage agent sliding in the heater.

Since the Direct Normal Irradiance (DNI) is constantly changing during the day, being strongest at noon and weak in the morning and afternoon, the intensity of solar radiation may also change over time during the day, thus the intensity of the solar radiation outputted by the solar energy collecting module may also change with time. The flow rate of the heat storage agent flowing into the heater may be changed by adjusting the rotation speed of the threaded screw sleeve of the heater and adjusting the opening of the flow control valve at the outlet of the storage tank in the heat storage agent flow adjusting module according to changes in the intensity of the solar radiation outputted by the solar energy collecting module.

The split range control method may include: adjusting the rotation speed of the multi-threaded screw sleeve according to the sensed temperature of the heat storage agent outputted by the heater and a pre-determined temperature threshold to change the falling speed of the heat storage agent in the heater, and adjusting the opening of the flow control valve of the heat storage agent flow adjusting module to change the flow of the heat storage agent flowing into the heater. The temperature of the heat storage agent leaving the heater may be stabilized at the required temperature threshold by adjusting the falling speed and the flow of the heat storage agent flowing into the heater.

For example, the apparatus of various examples may also include a split range control module for: sensing the temperature of the heat storage agent outputted by the heater; in response to a determination that the sensed temperature is lower than the predetermined temperature threshold, increasing the rotation speed of the rotatable multi-threaded screw sleeve to reduce the falling speed of the heat storage agent in the heater; in response to a determination that the rotational speed of the multi-threaded screw sleeve reaches a maximum value and that the sensed temperature of the heat storage agent is still lower than the pre-determined temperature threshold, reducing the size of the opening of the flow control valve to reduce the flow of heat storage agent flowing into the heater. Likewise, in response to a determination that the sensed temperature is higher than the predetermined temperature threshold, the split range control module may reduce the rotation speed of the multi-threaded screw sleeve to increase the falling speed of the heat storage agent in the heater; in response to a determination that the rotational speed of the multi-threaded screw sleeve reaches a minimum value and that the sensed temperature of the heat storage agent is still higher than the pre-determined temperature threshold, the split range control module may enlarge the opening of the flow control valve to increase the flow of heat storage agent flowing into the heater. The split range control module may be used for stabilizing the temperature of the heat storage agent leaving the heater stable at the pre-determined value.

Furthermore, in other examples, the rotation speed of the rotatable multi-threaded screw sleeve and the opening of the flow control valve may be adjusted at the same time, or the opening of the flow control valve may be adjusted according to a first condition before the rotation speed of the rotatable multi-threaded screw sleeve is adjusted according to a second condition.

3. The heat exchange module may include: a heat storage agent storage tank, a discharge valve and an air heater, see FIG. 2.

The heat storage agent storage tank may include a main storage tank 10 and a smaller storage tank 11 for storing high-temperature particles.

The discharge valve may include a first automatic discharge valve 12 for the main storage tank and a second automatic discharge valve 13 for the smaller storage tank.

The air heater 14.

The heat storage agent storage tank may store heat storage agent discharged from the heat storage agent collector. According to various examples, the cross section of the heat storage agent storage tank may be in the shape of a square.

The discharge valve is provided at the bottom of the heat storage agent storage tank, may adjust the flow rate of the heat storage agent flowing into the air heater from the heat storage agent storage tank.

The air heater may heat moderate-temperature compressed air inputted by the thermal power generating module using 1000° C. heat storage agent discharged by the heat storage agent storage tank to generate 900° C. compressed air, and feed this the high temperature compressed air back to the thermal power generating module.

As such, in various examples, the high-temperature heat storage agent discharged from the heat storage agent collector may be divided into two flows which respectively enter the main storage tank 10 and the smaller storage tank 11.

The smaller storage tank 11 may have a smaller storage space, and may discharge high-temperature heat storage agent rapidly into the air heater through the automatic discharge valve 13 provided at the lower part of the smaller storage tank 11. The automatic discharge valve 13 may be fully opened by default. The automatic discharge valve 12 of the main storage tank may be fully closed by default. High-temperature heat storage agent stored in the main storage tank 10 may be sufficient for a maximum of 24 hours of continuous use. In case of the night or an insufficient supply of solar radiation outputted by the solar energy collecting module, the flow rate of high-temperature heat storage agent discharged from the main storage tank 10 may be controlled by adjusting the opening of the automatic discharge valve 12, so that the heat storage agent can be discharged into the air heater to heat the moderate-temperature air.

Figure 4:
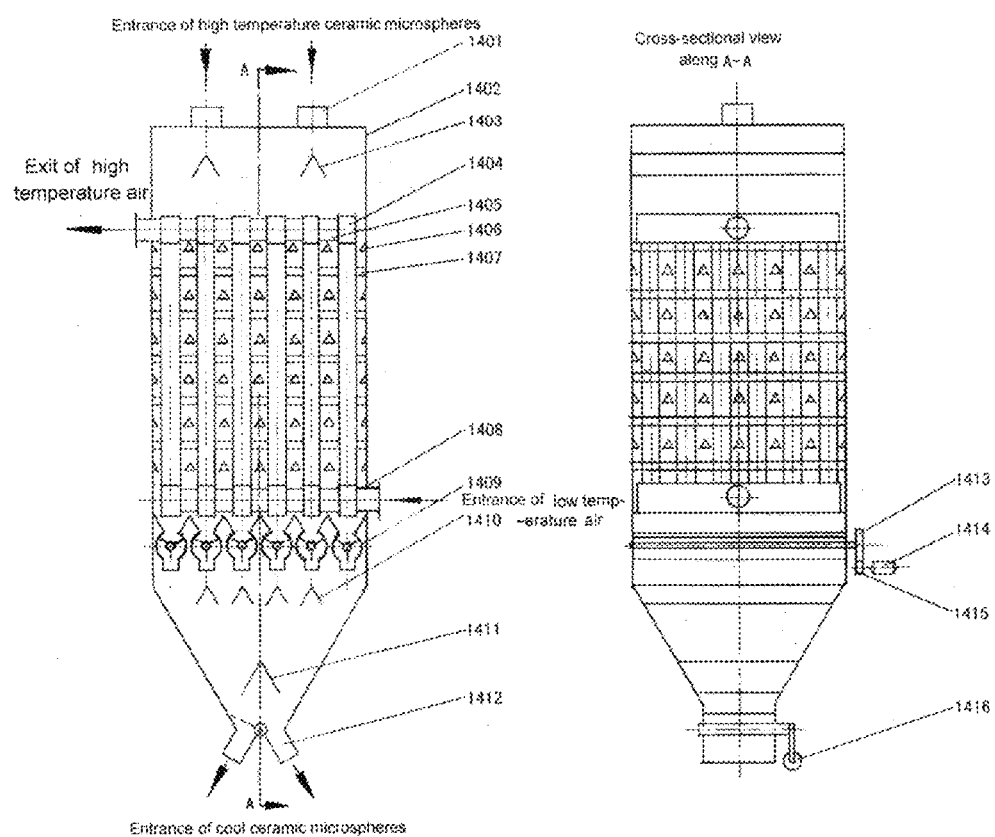
FIG. 4 is a schematic diagram illustrating the structure of an air heater with a high temperature particle moving bed in accordance with embodiments of the present disclosure.

FIG. 4 is a schematic diagram illustrating the structure of an air heater with a high-temperature particle moving bed in accordance with embodiments of the present disclosure. The figure on the left illustrates a front view of the air heater, and the figure on the right illustrates a cross-sectional view of the left figure along the direction A-A.

Referring to FIG. 4, the air heater may include: a particle entrance component 1401, a shell component 1402, a first particle guiding component 1403, a row of air heating pipes 1404, connecting pipes 1405 joining the air heating pipes, first flow guiding bars 1406 (in the inner wall of the shell), second flow guiding bars 1407 (in the heater), air entrance and exit pipes 1408, star rotation valve 1409 for controlling the flow rate of particles, a second particle guiding component 1410, a third particles guiding component 1411, a particle exit component 1412, a big drive gear 1413 of the star rotation valve, a variable-speed motor 1414 driving the star rotation valve, a small drive gear 1415 of the star rotation valve, and a discharge pneumatic switching valve 1416.

The particle entrance component 1401 may be provided at the top of the air heater, may include two entrances for allowing heat storage agent discharged via a discharge control valve into a hollow interior formed by the shell component 1402.

The first particle guiding component 1403 may divide the heat storage agent entering the hollow interior in the shell component 1402 via the particle entrance component 1401 into flows to expand the space occupied by the heat storage agent.

The row of air heating pipes 1404 may include a plurality of heating pipes, an upper linking pipe, and a lower linking pipe. The heating pipes are filled with a porous material for dividing moderate-temperature compressed air from the thermal power generating module into fine flows and directing the compressed air to flow against the high-temperature heat storage agent out of the heating pipes to heat the compressed air to about 900° C. within a short time. The porous material may have a surface-to-volume ratio greater than 500.

The connecting pipes 1405 may join the air heating pipes 1404, and may be joined with the air entrance and exit pipes 1408. Moderate-temperature compressed air enters and high-temperature compressed air exits the connecting pipes through the air entrance and exit pipes. The first flow guiding bars 1406 may be provided in the inner wall of the shell, may be in a single tilt shape for stirring the heat storage agent fallen onto the first flow guiding bars 1406.

The second flow guiding bars 1407 may be provided in the hollow interior of the air heater, may be in a double tilt shape for stirring the heat storage agent fallen onto the second flow guiding bars 1407.

The air entrance and exit pipes 1408 may allow compressed air to flow between the thermal power generating module and the connecting pipes 1405.

The star rotation valve 1409 may be provided below the row of air heating pipes 1404. The flow rate of the heat storage agent in the air heater 14 may be changed by adjusting the rotation speed of the star rotation valve 1409 to stabilize the temperature of air outputted by the air heater at about 900° C.

The second particle guiding component 1410 may be provided below the star rotation valve 1409, for dividing the heat storage agent discharged by the star rotation valve 1409 into plural flows.

The third particle guiding component 1411 may be provided below the second particle guiding component 1410, for dividing the heat storage agent discharged by the second particle guiding component 1410 into plural flows, and outputting the flows to the particle exit component 1412.

The particle exit component 1412 may output the heat storage agent after heat exchange to the heat storage agent transporting module.

The big drive gear 1413, the speed-variable motor 1414 and the small drive gear 1415 may drive the star rotation valve 1409 to rotate and adjust the rotation speed of the star rotation valve 1409.

The discharge pneumatic switching valve 1416 may be provided below the third particle guiding component 1411 for changing the flow direction of the heat storage agent flowing out of the air heater.

According to the air heater of various examples, the connecting pipes 1405, the air entrance and exit pipes 1408 may be made of silicon carbide ceramics. The row of air heating pipes may include a plurality of heating pipes and an upper linking square pipe and a lower linking square pipe. The air heating pipes may be arranged to stand upright side by side. The outer wall of the air heating pipes may be made of silicon carbide ceramics, and silicon carbide ceramic foam with a surface-to-volume ratio of over 500 may be filled in the air heating pipes. According to various examples, the silicon carbide ceramic pipes (including the silicon carbide ceramic form filled in the pipes) and the upper linking square pipe and the lower linking square pipe may be manufactured through multiple sintering process, and can withstand high-temperature compressed air under 5 times of atmospheric pressure for a long time without leaking.

The first flow guiding bars 1406 and the second flow guiding bars 1407 may be used for continuously stirring high-temperature ceramic microspheres during the falling process of the microspheres to increase the heating efficiency.

Through the heat exchange in the air heater 14, the high-temperature heat storage agent (e.g., the ceramic microspheres) may be cooled down to a temperature of about 600° C. The ceramic microspheres may be made of any one or any combination of materials including, but not limited to, alumina, mullite, quartz, or the like.

4. The heat transferring module, as shown in FIG. 2, may include: a main discharge tank 15, a smaller discharge tank 16, a first automatic discharge valve 17 of the main discharge tank, a second automatic discharge valve 18 of the smaller discharge tank for moderate temperature particles, and connecting pipes 19. In various examples, the cross section of the main discharge tank 15 and the smaller discharge tank 16 may be in the shape of a square. The cross section may also be in another shape, such as round. The tanks in other shapes may be more complex to manufacture and more expensive. A cylindrical tank has a smaller storage space than tanks with a square cross section having the same dimension.

A portion of moderate temperature heat storage agent discharged by the air heater 14 may enter the main discharge tank 15 through a connecting pipe 19 and automatically enter the first hopper 1-1 of the first elevator having automatic loading and unloading capabilities via the first automatic discharge valve 17 provided at the lower part of the main discharge tank 15. The other portion of the moderate temperature heat storage agent discharged by the air heater 14 may enter the smaller discharge tank 16 via another connecting pipe 19, and automatically enter the second hopper 1-2 of the second elevator via the second automatic discharge valve 18. After being loaded, the first hopper 1-1 and the second hopper 1-2 may be elevated to the top of the solar tower.

5. The thermal power generating module, see FIG. 2, may include: an air filter 20, a turbine combustor 21, a recuperator 22 and a turbine generator 23.

The air filter 20 may filter air inputted from exterior and output the air to the turbine generator 23.

The turbine combustor 21 may feed high-temperature compressed air from the heat exchange module to the turbine generator where the compressed air may expand to propel the turbine generator to rotate and generate power, and discharge the exhaust air to the recuperator 22; or burn fuel injected into the turbine combustor 21 to generate high temperature to make air expand to propel the turbine generator to rotate and generate power when the tower Brayton thermal power unit with heat storage starts up or there are insufficient solar power for a long time, and discharge exhaust gas to the recuperator 22.

The recuperator 22 may perform heat exchange between the exhaust gas from the turbine generator 23 and compressed air to heat the compress air and reduce the temperature of the exhaust gas to improve the thermal efficiency of the turbine generator, output the heated compressed air to the heat exchange module, and discharge the exhaust gas.

The turbine generator 23 may compress inputted air to generate compressed air, output the compressed air to the recuperator 22; convert mechanical energy into electrical energy when propelled by expansion of the air outputted by the turbine combustor 21, and output the exhaust gas to the recuperator 22.

The turbine generator 23 may include a turbine 2301, a compressor 2302, a speed reducing gearbox 2303 and an alternator 2304.

The turbine 2301, driven by expansion of high-temperature compressed air, may rotate to convert thermal energy into mechanical energy, and output exhaust gas which has done work to the recuperator 22.

The compressor 2302 may rotate when driven by rotation of a single-stage radial turbine 2301, compress the air filtered by the air filter 20, and output the compressed air to the recuperator 22.

The speed reducing gearbox 2303 may be driven by the single-stage radial turbine 2301 to reduce the rotation speed of an output shaft of the gearbox 2303 to a synchronous speed required by the alternator 2304, and drive the alternator 2304 to generate power.

The alternator 2304 may convert rotational mechanical energy of into electrical energy when driven by the gearbox 2303.

According to the thermal power generating module, air may enter the compressor 2302 from exterior after being filtered by the air filter 20, and be compressed to an absolute pressure of 4 to 4.5 times of the atmospheric pressure. The compressed air enters the recuperator 22 which may be a plate heat exchanger with a large surface-to-volume ratio. The recuperator 22 may have, in the interior, compressed air channels and exhaust gas channels which are stacked to overlap each other. The two types of gas have respective flow channels thus will not mix with each other, and may be provided with a large area for heat exchange. The exhaust gas after doing work outputted by the turbine 2301 has a temperature of about 600° C., may heat the compressed air to a temperature of about 500° C. The compressed air is then outputted to the air heater 14. The exhaust gas may be discharged at a temperature of about 250° C.

The 500° C. compressed air may be heated in the air heater 14 to a temperature of about 900° C. The 900° C. compressed air may enter the turbine via the turbine combustor 21, expand and propel the turbine 2301 to rotate. The rotation of the turbine 2301 may drive the compressor 2302 and the gearbox 2303 to rotate. After the rotation speed of the gearbox 2303 is reduced, the gearbox 2303 may drive the alternator 2304 to rotate. Thus, thermal power generation can be implemented.

In various examples, the turbine combustor may also burn fuel (natural gas or oil) injected into the combustor to generate air with high temperature and high pressure to drive the turbine generator to generate power when the tower Brayton solar thermal power unit with heat storage starts up or there is no solar power in a long time. Thus, discontinuity and instability of solar power generation can be avoided.

In order to reduce the production cost and simplify the system, an example may use a single-stage radial turbine and a single-stage centrifugal compressor in the turbine generator.

In addition, since the whole Brayton solar thermal power unit with heat storage may be at a high temperature of about 500° C.~1000° C., heat insulation may be applied to equipments and pipelines in the Brayton solar thermal power unit with heat storage to minimize heat loss in order to improve the operation efficiency of the unit.

6. In general, the tower Brayton solar thermal power unit with heat storage of various examples may have the following technical effects.

(1) A volumetric heater of heat storage agent may be used to allow concentrated solar radiation to directly heat the heat storage agent. A rotatable multi-threaded screw sleeve may be provided in the heater to make the falling speed of the heat storage agent controllable through adjusting the rotation speed of the multi-threaded screw sleeve. Thus, given the ever-changing DNI, the heat storage agent particles can be effectively heated to a required temperature range, and the heating efficiency can be improved. Compared with conventional heat storage agents heaters, for collecting the same power, the heater of various examples of the present disclosure is not only small in size, but also enables a single heater to meet the requirements of a megawatt solar thermal power generation unit, which can effectively increase the maximum power capacity of a single tower Brayton thermal power unit with heat storage. Further, without the need of using the quartz glass cover which is expensive and difficult to manufacture, the interior of the heater may be made of sintered silicon carbide or silicon nitride ceramic which is inexpensive and has abundant raw materials, the heater has outstanding temperature resistance, wear resistance and thermal shock resistance, which not only significantly reduces the manufacturing costs, but also remarkably increase reliability and the lifetime of the unit.

(2) Silicon carbide ceramic tubes filled with silicon carbide ceramic foam may be used as the heating components (the row of air heating pipes) of the air heater. Since the heat transfer coefficient of the silicon carbide under high temperature is more than twice of that of metal, and the silicon carbide foam has a large surface-to-volume ratio, the speed and efficiency of heating air can be significantly improved. Further, sintered silicon carbide has excellent heat resistance and abrasion resistance as well as a small thermal expansion coefficient as compared with other air heating devices, the reliability can be significantly improved and the cost can be reduced. Since the heating pipes are filled with silicon carbide foam, the heat transfer area is significantly increased. Thus, silicon carbide tubes with a larger diameter and shorter heating elements may be used, thus the length and volume of the air heater can be reduced.

(3) Due to the use of the proppant with improved properties (alumina ceramic microspheres) as the heat storage agent, ceramic microspheres are allowed to work under a maximum temperature of 1600° C., significantly higher than the work temperature of 1000° C. of other heat storage agents. Thus, the ceramic microspheres not only outperform molten salts which are conventional heat storage agents in heat capacity, but also have no risk of clotting and corrosion, thus are very convenient to use. In addition, the spherical structure of the ceramic microspheres allows them to fully accept the solar radiation outputted by the solar energy collection module through rolling. Thus, the ceramic microspheres can be heated more uniformly, the heating efficiency can be improve. Furthermore, the ceramic microspheres can fully transfer heat to the heating elements of the air heater through rolling while exchanging heat with the heating elements of the air heater, thus the heat exchange efficiency can be improved. Further, the ceramic microspheres have industrialized domestic production, wide-range supply, low cost, and can be used in large scale without introducing any risks.

(4) Use of the main storage tank for storing high-temperature heat storage agent enables continuous heat supply for 24 hours, can allow the tower Brayton thermal power unit with heat storage to generate electrical energy continuously without being restricted by changes in weather conditions and no solar power at night. There is no need to change the structure of the tower Brayton thermal power unit with heat storage even if there have been no solar energy for days because oil and natural gas can be used as the source of energy. Thus, solar energy, stored solar energy and fossil fuel can be used alternatively or in combination to ensure continuous electricity generation.

Obviously, those skilled in the art may make numerous changes and variations on the solution of the present disclosure without departing from the technical mechanism and scope thereof. Accordingly, the present disclosure also includes the changes and variations as long as such changes and variations are within the scope as set forth in the claims and the equivalent substitutions thereof.

The invention claimed is:

1. A heater of heat storage agent, comprising: a feeder, a threaded screw sleeve and a heat storage agent collector, wherein the feeder is provided at an upper part of the heater, capable of receiving heat storage agent discharged from above the heater and discharging the heat storage agent into the threaded screw sleeve;

the threaded screw sleeve is provided at the middle of the heater of heat storage agent, comprising a multi-threaded screw sleeve made of high temperature materials, the multi-threaded screw sleeve comprises a hollow interior, a plurality of spiral slideways are provided in an inner wall of the multi-threaded screw sleeve for receiving the heat storage agent discharged from the feeder and directing the heat storage agent to fall along the spiral slideways; a falling speed of the heat storage agent in the spiral slideways is adjustable by adjusting a rotation speed of the multi-threaded screw sleeve; the hollow interior is capable of housing concentrated solar radiation outputted by an external solar energy collecting module and heating the heat storage agent discharged into the multi-threaded screw sleeve using the concentrated solar radiation; and the heat storage agent collector is provided at a lower part of the heater, capable of receiving the heat storage agent heated and discharged from the rotating multi-threaded screw sleeve and outputting the heated heat storage agent.

2. The heater of claim 1, wherein the threaded screw sleeve further comprises: an insulation sleeve made of a heat insulating material and a shell for a rotating part of the heater, wherein the shell is provided outside the threaded screw sleeve;

the rotating multi-threaded screw sleeve is provided inside the threaded screw sleeve; and the insulation sleeve is provided between the multi-threaded screw sleeve and the shell, for thermal insulation of the heat storage agent.

3. The heater of claim 1, wherein the spiral slideways are uniformly distributed along the direction of diameter of the rotating multi-threaded screw sleeve, and the rotating multi-threaded screw sleeve rotates in a direction the same with or opposite to the helix direction of the spiral slideways.

4. The heater of claim 1, wherein a helix angle of the spiral slideways is between 5 to 85 degrees.

5. The heater of claim 1, wherein a width of the spiral slideways is 3 to 20 times of a diameter of the heat storage agent.

6. The heater of claim 1, wherein the heat storage agent comprises ceramic microspheres.

7. A Brayton solar thermal power unit with heat storage, comprising: a heat storage agent flow adjusting module, a solar energy collecting module, a heater of heat storage agent, a heat exchange module, a thermal power generating module and a heat storage agent transporting module, wherein
    the heat storage agent flow adjusting module is configured to adjust flow of heat storage agent flowing into the heater according to an intensity of solar radiation outputted by the solar energy collecting module;
    the solar energy collecting module is configured to collect solar energy using at least one concentrator, and heat the heat storage agent in the heater using the collected solar energy;
    the heat exchange module is configured to perform heat exchange between heat storage agent discharged from the heater and compressed air from the thermal power generating module, output the compressed air after the heat exchange to the thermal power generating module, output the heat storage agent after the heat exchange into the heat storage agent transporting module;
    the heat storage agent transporting module is configured to collect the heat storage agent discharged by the heat transferring module, transport and output the collected heated storage agent to the heat storage agent flow adjusting module; and
    the thermal power generating module is configured to convert thermal energy of the compressed air from the heat exchange module into mechanical energy, convert the mechanical energy into electrical energy, and output exhaust gas; compress air taken in under atmospheric pressure and output the compressed air to the heat exchange module;
    wherein the heat storage agent adjusting module comprises: a hopper, a discharge tank, a discharge valve, a storage tank, and a flow control valve, wherein
    the hopper is configured to discharge heat storage agent collected by the heat storage agent transporting module into the discharge tank;
    the discharge tank is configured to store heat storage agent discharged by the hopper;
    the discharge valve is provided at the bottom of the discharge tank, is configured to adjust the flow of the heat storage agent discharged from the discharge tank to the storage tank;
    the storage tank is configured to store the heat storage agent discharged from the discharge tank via the discharge valve; and
    the flow control valve is provided at the bottom of the storage tank, and is configured to adjust the flow of the heat storage agent in the heater according to an intensity of solar radiation outputted by the solar energy collecting module.

8. The Brayton solar thermal power unit of claim 7, wherein the heat storage agent comprises ceramic microspheres.

9. The Brayton solar thermal power unit of claim 7, further comprising: a split range control module, configured to sense a temperature of the heat storage agent outputted by the heater, compare the sensed temperature with a pre-determined temperature threshold; if the sensed temperature is inconsistent with the pre-determined temperature threshold, adjust a rotation speed of the rotating multi-threaded screw sleeve to change a falling speed of the heat storage agent in the heater, and adjust an opening of the flow control valve to change the flow of heat storage agent in the heater, until it is determined the sensed temperature is identical to the pre-determined temperature threshold.

10. The Brayton solar thermal power unit of claim 7, wherein the heat exchange module comprises a heat storage agent storage tank, a discharge adjusting valve and an air heater, wherein
    the heat storage agent storage tank is configured to store the heat storage agent discharged by the heat storage agent collector of the heater;
    the discharge adjusting valve is provided at the bottom of the heat storage agent storage tank, is configured to adjust the flow of the heat storage agent discharged into the air heater from the heat storage agent storage tank; and
    the air heater is configured to heat compressed air with a first temperature inputted by the thermal power generating module using the heat storage agent discharged by the heat storage agent storage tank to generate compressed air with a second temperature higher than the first temperature, and feed the compressed air with the second temperature back to the thermal power generating module.

11. The Brayton solar thermal power unit of claim 10, wherein the air heater comprises: a particle entrance component, a row of air heating pipes, connecting pipes joining the air heating pipes, and air entrance and exit pipes; wherein
    the particle entrance component is provided at the top of the air heater with a high-temperature particle moving bed, comprises an entrance for the heat storage agent, and is configured to guide the heat storage agent discharged through the discharge adjusting valve into a hollow interior formed by a shell component;
    the air entrance and exit pipes, the row of air heating pipes and the connecting pipes are provided in the hollow interior of the air heater;
    the row of air heating pipes comprises a plurality of heating pipes, an upper linking pipe, and a lower linking pipe, the heating pipes are filled with a porous material for dividing compressed air with a first temperature from the thermal power generating module into fine flows and directing the compressed air to flow against the heat storage agent discharged outside the heating pipes to exchange heat to heat the compressed air to a second temperature;
    the connecting pipes are configured to join the air heating pipes, and are joined with the air entrance and exit pipes, wherein the compressed air with the first temperature enters and the compressed air with the second temperature exits the connecting pipes through the air entrance and exit pipes; and
    the air entrance and exit pipes are configured to allow compressed air to flow between the thermal power generating module and the connecting pipes.

12. The Brayton solar thermal power unit of claim 11, wherein the air heater further comprises:

a flow guiding bar for directing flow of particles in the hollow interior or directing the flow of particles along the inner wall of the shell, is provided in the hollow interior of the air heater with the high-temperature particle moving bed, is configured for stirring the heat storage agent discharged into the hollow interior.

13. The Brayton solar thermal power unit of claim 11, wherein the air heater further comprises:
a star rotating valve for controlling the flow of particles discharged, is provided below the row of air heating pipes, wherein a flow rate of the heat storage agent in the air heater with the high-temperature particle moving bed is adjustable by adjusting the rotation speed of the star rotating valve so that the temperature of the air outputted by the air heater reaches and remains stable at a required temperature.

14. The Brayton solar thermal power unit of claim 11, wherein each heating pipe in the row of air heating pipes is a silicon carbide ceramic pipe, and each silicon carbide ceramic pipe is filled with porous carbide ceramic material with a surface-to-volume ratio of over 500.

15. An air heater, comprising: a particle entrance component, a row of air heating pipes, connecting pipes joining the air heating pipes, and air entrance and exit pipes, wherein
the particle entrance component is provided at the top of the air heater with a high-temperature particle moving bed, comprises an entrance for heat storage agent, is configured to direct the heat storage agent discharged via a discharge control valve into a hollow interior formed by a shell;
the air entrance and exit pipes, the row of air heating pipes and the connecting pipes are provided in the hollow interior of the air heater;
the row of air heating pipes comprises a plurality of heating pipes and an upper linking pipe and a lower linking pipe, each of the heating pipes is filled with a porous material which divides compressed air with a first temperature from a thermal power generating module into fine flows and directs the fine flows to flow against heat storage agent discharged outside the heating pipes to exchange heat to heat the compressed air to a second temperature;
the connecting pipes are configured to join the row of air heating pipes, and are joined with the air entrance and exit pipes, wherein the compressed air with the first temperature enters and the compressed air with the second temperature exits the connecting pipes through the air entrance and exit pipes; and
the air entrance and exit pipes are configured to allow compressed air to flow between the thermal power generating module and the row of air heating pipes.

16. A method of controlling temperature of heated heat storage agent in a Brayton solar thermal power unit with heat storage, comprising:
providing a Brayton solar thermal power unit with heat storage which comprises: a heater of heat storage agent and a heat storage agent flow adjusting module; the heat storage agent flow adjusting module is capable of obtaining heat storage agent, and discharging the heat storage agent into the heater via a flow control valve set at the bottom of the heat storage agent flow adjusting module; the heater comprises a multi-threaded screw sleeve made of high temperature materials, the multi-threaded screw sleeve has a hollow interior, a plurality of spiral slideways are provided in an inner wall of the multi-threaded screw sleeve for receiving the heat storage agent from the heat storage agent flow adjusting module, the heat storage agent discharged in the multi-threaded screw sleeve is heated by solar radiation concentrated in the hollow interior;
sensing a temperature of the heat storage agent outputted by the heater;
comparing the sensed temperature with a pre-determined temperature threshold; in response to a determination that the sensed temperature is inconsistent with the temperature threshold, adjust a rotation speed of the rotating multi-threaded screw sleeve to change a falling speed of the heat storage agent in the heater, and adjust an opening of the flow control valve of the heat storage agent flow adjusting module to change the flow of the heat storage agent in the heater, until it is determined the sensed temperature of the heat storage agent is consistent with the pre-determined temperature threshold.

17. The Brayton solar thermal power unit of claim 8, wherein the ceramic microspheres is made of one of alumina, mullite, or quartz, or a mixture of any combination of alumina, mullite, or quartz.

* * * * *